July 30, 1946.   J. P. VOLLRATH   2,405,076
THERMOCOUPLE
Filed May 30, 1944
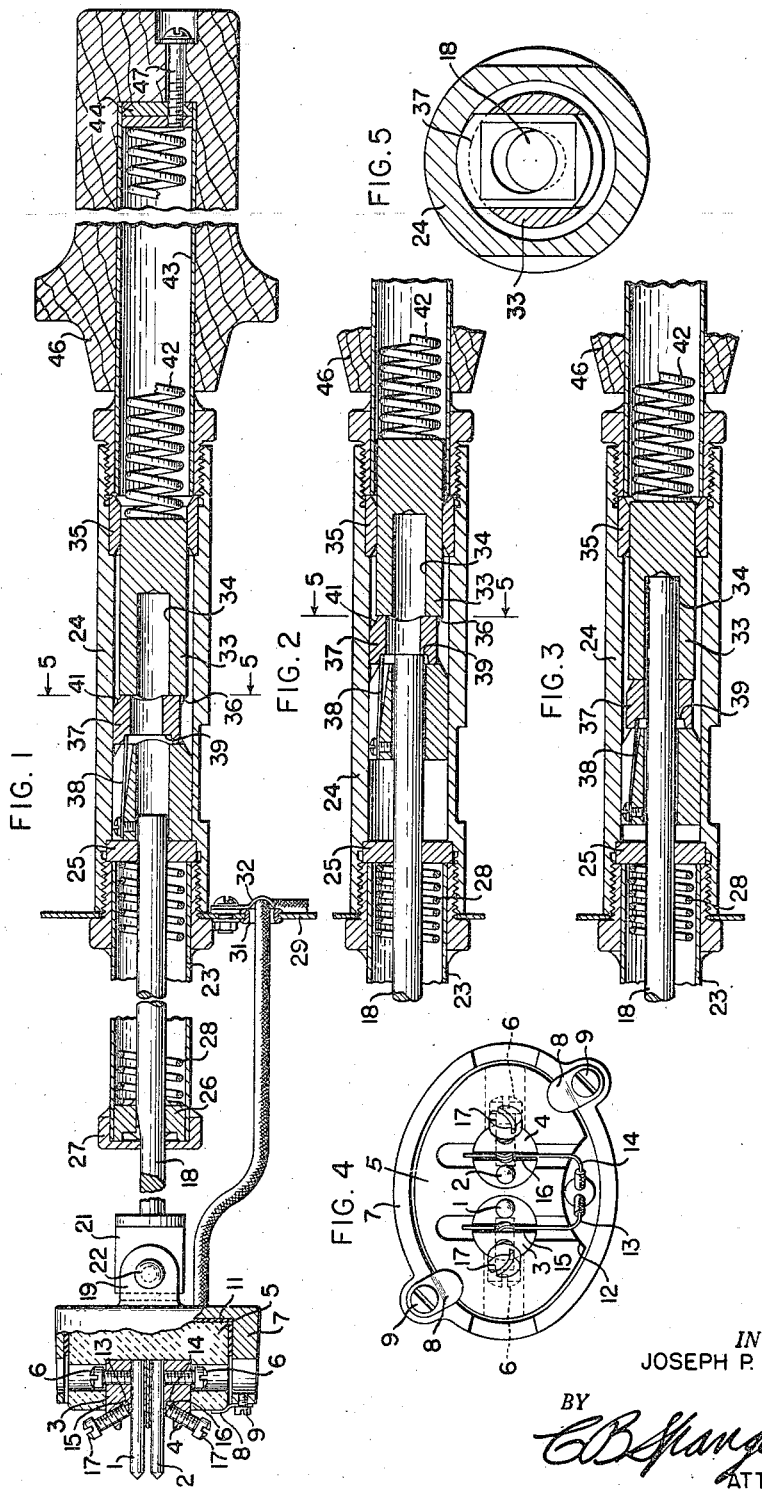
INVENTOR.
JOSEPH P. VOLLRATH
BY
C. B. Spangenberg
ATTORNEY.

Patented July 30, 1946

2,405,076

UNITED STATES PATENT OFFICE 2,405,076

THERMOCOUPLE

Joseph P. Vollrath, Glenside, Pa., assignor to The Brown Instrument Company, Philadelphia, Pa., a corporation of Pennsylvania Application May 30, 1944, Serial No. 538,079

9 Claims. (Cl. 136—4)

The present invention relates to thermocouples and more particularly to a contact thermocouple for use in measuring the sub-surface temperature of a hot metal object.

In many metal working processes the metal must be heated before it can be worked upon, and the working temperature is critical. It becomes necessary therefore to have some means to measure quickly the temperature of a billet as it leaves a heating furnace and before it is worked upon. The measuring process is complicated by the fact that the billets as they are heated often become coated with a thin oxide film that must be punctured before a reading can be obtained.

It is an object of the present invention to provide a thermocouple that may be used to obtain a measurement of the temperature of a billet or other metal object. It is a further object of the invention to provide a thermocouple which will easily penetrate an oxide film that forms on the surface of a hot billet in order for the thermocouple wires to make a good contact with the metal. This is accomplished by providing a hammer device that automatically acts on the thermocouple to force it into the surface of the billet when it has been moved against the same by an operator.

It is another object of the invention to provide a contact type thermocouple which has built into it a means for forcing the thermocouple wires into a hot billet whose temperature is being measured. This construction insures a good electrical contact between the thermocouple wires and the billet. The construction also provides a means to imbed the thermocouple wires in the billet so that a reading of the subsurface temperature may be obtained.

The various features of novelty which characterize my invention are pointed out with particularity in the claims annexed to and forming a part of this specification. For a better understanding of the invention, however, its advantages, and specific objects attained by its use, reference should be had to the accompanying drawing and descriptive matter in which I have illustrated and described preferred embodiments of the invention.

In the drawing:

Figure 1 is a sectional view of the thermocouple,

Figure 2 is a view showing the parts in a different position,

Figure 3 is a view showing the parts in a still different position,

Figure 4 is a view showing the end of the thermocouple head and

Figure 5 is a view taken on line 5—5 of Figure 1.

The thermocouple head unit is shown in Figures 1 and 4. Extending from the head are a pair of pointed thermocouple wires 1 and 2 made out of material such as Chromel and Alumel or a similar material that is suitable for the range of temperature for which the thermocouple is to be used. These wires are held in place in a pair of metal plugs 3 and 4, that are in turn received in openings in a ceramic supporting member 5. The metal plugs are held in place in the ceramic supporting member by means of screws 6 that extend through openings in the member 5 and are threaded into the plug members 3 and 4 and into engagement with the thermocouple wires in these members to hold the thermocouple wires in place. The ceramic member is held and protected by a cup-shaped member 7 that has in it a thin lining of asbestos 11 to give a slightly cushioned effect between the parts 5 and 7. Clips 8 are attached to the cup-shaped member 7 by means of screws 9 and extend over the edge of the ceramic member to hold it in place.

The supporting member 5 is provided, as best shown in Figure 4, with a reentrant portion 12 in which thermocouple extension wires 13 and 14 are received. These wires extend out of the back of the cup-shaped member 7 and are brought upwardly and bent over into grooves 15 and 16 of the plug members 3 and 4 respectively and are held in these grooves by means of screws 17, as best shown in Figure 1 of the drawing.

The thermocouple head unit is mounted on a supporting rod 18 and the mounting permits a small angular movement between the two. To this end a clevis 19 is attached to the back of the part 7 and receives in it a tongue 21 on the end of the rod 18. A pivot pin 22 extends through the clevis and the tongue to hold these parts together. The rod 18 is slidably mounted in a housing which has in it provisions to strike a blow on the end of the rod so that the pointed ends of the thermocouple wires may be forced into some object whose temperature is to be measured. The housing in this case consists of two tubes 23 and 24 that are joined together as best shown in Figure 1 of the drawing. The rod 18 is guided for movement in these tubes on one end by a bearing and stop member 25 that is held in place at the junction between the tubes, and on the other end by a disc 26 that is fastened to the rod and which slides within the tube 23.

A cap 27 is attached to the left end of the tube 23 to limit the movement of the rod 18 to the right. The rod is resiliently biased at all times to the position shown in which disc 26 abuts cap 27 by a spring 28 that bears with one end against the disc 26 and with the other end against member 25. It is noted that the rod 18 is formed with a flat portion on its upper side where it extends through the cap 27. This is for the purpose of preventing rotation of the rod with respect to the housing so that the thermocouple head will always be held in the same position relative to the housing. Also fastened between the tube members 23 and 24 is a radiation shield 29 that has an opening 31 in it through which the thermocouple lead wires 13 and 14 extend. These wires are held in position against the disc 29 by means of a clip 32.

The hammer or impact member which serves to give a driving blow to the thermocouple head and which has been mentioned above, is located within the tubular member 24 of the housing. This hammer or impact member is shown at 33 and consists of a cylindrical metal member having in it a bore 34 that receives the right end of the rod 18. This impact member has two diameters, the larger being on its left end and of a diameter equal to the internal diameter of the tube member 24. The right end of the impact member is slightly smaller in diameter and is guided in its movement by a short sleeve 35 which is received in the end of the tube 24. The impact member 33 has an opening 36 extending transversely of it and midway between its ends. Received in this opening is a latch member 37 that is biased upwardly as shown in Figure 1 by means of a spring 38 that is carried by the hammer. The latch member is formed with a shoulder 39 that obstructs the central opening 34 of the impact member and which is in the path of movement of rod 18. The latch is also provided with an inclined surface 41 which is adapted to cooperate with an oppositely inclined surface formed on the left end of the sleeve 35.

The impact member is normally biased by a spring 42 to the position shown in Figure 1 in which its left end engages one face of the member 25. This spring is received in a tube 43 that is attached to and extends to the right beyond the end of the tube 24. The outer end of the tube 43 is closed by disc 44 that is attached thereto. A wooden handle 46, by which the assembly can be carried, is telescoped over the tube 43 and is held in position on this tube by a screw 47 that is threaded into the disc 44. It is noted that this screw is off center with respect to both the handle and the disc 44. The purpose of this is to prevent rotation of the handle 46 with respect to the tube 43.

In operation the operator grasps the handle 46 and presses the thermocouple wires 1 and 2 against the side of an object whose temperature is to be measured. At this time the parts are in the normal position shown in Figure 1 with the rod 18 pressed to the left by spring 28 so that the disc 26 is in engagement with the cap 27, and the impact member 33 has its left end in engagement with the disc 25. In order to get a good electrical contact between the object whose temperature is to be measured and the thermocouple wires, the operator forces the entire assembly to the left in Figure 1. As this occurs the spring 28 will be compressed by the disc 26 and the right end of rod 18 will slide through the bore 34 of the impact member 33. This relative movement continues until the end of the rod engages the shoulder 39 of the latch member, at which time the impact member and the latch will also begin to move to the right relative to the housing. The parts at this time will be at the position shown in Figure 2 of the drawing. Continued movement of the housing and handle to the left will cause the latch member and the impact member to be moved to the right relative to the tube 24 to bring the edge 41 of the latch member into engagement with the cooperating edge of the sleeve 35. Such engagement will force the latch member downwardly in each of the Figures 1, 2 and 3 until it reaches the position shown in Figure 3 at which time the bore 34 of the impact member is clear of any obstruction. Spring 42 will therefore quickly and violently move the impact member to the left so that it will deliver a blow to the end of the rod 18 and thereby force the points of the thermocouple wires into the object whose temperature is to be measured. This blow is sufficient to drive the points into the object to such an extent that a good electrical contact may be obtained and drive them into the object deep enough to go through any oxide film which may be formed on the surface of the object, if it is metal. The measurement then obtained by the thermocouple will be a measure of the sub-surface temperature of the object.

From the above description it will be seen that I have provided a thermocouple assembly in which a continued movement of a thermocouple toward the object whose temperature is to be measured will cause a blow to be delivered to the thermocouple to drive the thermocouple head toward this object and thereby giving a good electrical contact so that an accurate reading may be obtained. By pivoting the thermocouple head to the supporting rod it is not necessary for the operator to line up the thermocouple exactly perpendicular to the object. The slight oscillation that is permitted between the thermocouple head and the rest of the structure will take care of any slight irregularities in the object or in a slightly improper alignment of the same. The thermocouple assembly can be made of any suitable length to permit the operator to stand away from the object so that he will not be burned while a temperature measurement is being taken. The radiation shield 29 also serves to protect the operator during the time that he is using the instrument.

While in accordance with the provisions of the statutes, I have illustrated and described the best form of this invention now known to me, it would be apparent to those skilled in the art that changes may be made in the form of the apparatus disclosed without departing from the spirit of this invention as set forth in the appended claims, and that in some cases certain features of this invention may sometimes be used to advantage without a corresponding use of other features.

Having now described this invention, what I claim as new and desire to secure by Letters Patent is:

1. A thermocouple assembly comprising a pair of thermocouple wires, supporting means for said wires to hold them in a parallel extended position, and automatic means to apply a blow to said supporting means when said thermocouple wires are moved with a predetermined pressure into engagement with an object whose temperature is to be measured to force said thermocouple wires into engagement with the object.

2. A thermocouple assembly comprising a pair of thermocouple wires, supporting means for said wires, means to deliver a blow to said supporting means to force said thermocouple wires toward an object against which they are placed, force supplying means to operate said blow delivering means, and means to release said force applying means operated by pressing said thermocouple wires with a predetermined pressure against an object whose temperature is to be measured.

3. A thermocouple assembly comprising a pair of thermocouple wires, a support to hold said wires in operative position, a rod, means to pivotally mount said support on said rod, a holder, means to slidably mount said rod in said holder whereby said rod may be moved to various positions therein as said thermocouple wires are pressed against an object whose temperature is to be measured, and means carried by said holder to deliver a blow to said rod in a direction to force said thermocouple wires toward an object against which they have been placed when said rod and holder reach a given relative position.

4. A thermocouple assembly comprising a pair of thermocouple wires, supporting means upon which said thermocouple wires are mounted, a holder, means to slidably mount said supporting means in said holder whereby when said thermocouple wires are placed against an object whose temperature is to be measured said holder may be moved along said supporting means, and means carried by said holder to deliver a blow to said supporting means to force said thermocouple wires toward the object when said supporting means and holder reach a predetermined relative position.

5. A thermocouple assembly comprising a pair of thermocouple wires, a support to hold said wires, a rod, means to mount said support on said rod, a holder to slidably receive said rod, means carried by said holder to deliver a blow to the end of said rod to force said thermocouple wires toward an object against which they are pressed, and means to operate said last mentioned means operated upon movement of said rod to a predetermined position in said holder.

6. A thermocouple assembly comprising a pair of thermocouple wires, a support to hold said wires in operative position, a rod upon which said support is mounted, a holder, means to slidably mount said rod in said holder, means normally operating to bias said rod to a given position in said holder, impact means in said holder to deliver a blow to said rod, means to operate said impact means, means to prevent said impact means from delivering said blow, and means operative upon movement of said impact means to a predetermined position in said holder to render said preventing means inoperative.

7. A thermocouple assembly comprising a pair of thermocouple wires, supporting means to hold said wires in operative position, a holder in which said supporting means is slidably mounted, means to bias said supporting means to a given position in said holder, an impact member slidably mounted in said holder concentric with said supporting means, means to force said impact means toward said supporting means, means operated by said supporting means as the latter is moved from its given position in said holder to move said impact means in said holder against the force of said forcing means, and means to render said operated means inoperative when said supporting means and impact means reach a predetermined relative position in said holder.

8. A thermocouple assembly comprising a pair of thermocouple wires, supporting means to hold said wires in operative position, a holder in which said supporting means is slidably mounted, means to bias normally said supporting means to a first given position in said holder, an impact member slidably mounted in said holder, means to bias said impact member toward said supporting means whereby said impact means may deliver a blow to said supporting means, latch means movable with said impact means and engageable by said supporting means to maintain said impact means away from said supporting means, and means to release said latch means upon movement of said supporting means and impact means to a predetermined position in said holder.

9. A thermocouple assembly comprising a pair of thermocouple wires, supporting means to hold said wires in operative position, a holder in which said supporting means is slidably mounted, means to bias normally said supporting means to a given position in said holder whereby when said thermocouple wires are placed against an object whose temperature is to be measured said holder may be moved relative to said supporting means in a direction toward said object, and means carried by said holder to deliver a blow to said supporting means in a direction to force said thermocouple wires toward the object when said holder and supporting means reach a predetermined relative position.

JOSEPH P. VOLLRATH.